United States Patent
Burke et al.

(10) Patent No.: US 6,372,988 B1
(45) Date of Patent: Apr. 16, 2002

(54) SEAMLESS FLAT-ROUND CONDUCTIVE CABLE FOR A RETRACTABLE CORD REEL

(76) Inventors: Paul C. Burke, 470 Heather La., Lake Forest, IL (US) 60045; John S. Runzel, 29W047 Bode Rd., Elgin, IL (US) 60120

( * ) Notice: Subject to any disclaimer, the term of this patent is extended or adjusted under 35 U.S.C. 154(b) by 0 days.

(21) Appl. No.: 09/405,742

(22) Filed: Sep. 24, 1999

Related U.S. Application Data

(63) Continuation-in-part of application No. 09/003,309, filed on Jan. 16, 1998, now Pat. No. 6,019,304, which is a continuation-in-part of application No. 08/779,794, filed on Jan. 7, 1997, now abandoned, and a continuation-in-part of application No. 09/197,326, filed on Nov. 20, 1998, now abandoned.

(51) Int. Cl.⁷ ................................................. H01B 7/06
(52) U.S. Cl. .................... 174/69; 242/360; 242/370; 174/70 R; 174/72 R; 174/117 R; 174/117 F
(58) Field of Search ................... 174/68.1, 69, 70 R, 174/72 TR, 72 A, 113 R, 117 R, 117 F, 149 R, 27; 242/370, 385, 360, 230, 234

(56) References Cited

U.S. PATENT DOCUMENTS

| | | | |
|---|---|---|---|
| 3,701,964 A | 10/1972 | Cronin | 339/17 F |
| 3,852,517 A | 12/1974 | Del Fava | 174/84 R |
| 4,053,118 A * | 10/1977 | Aikins | 242/107.11 |
| 4,229,615 A | 10/1980 | Orr et al. | 174/117 M |
| 4,472,010 A * | 9/1984 | Parnello | 339/8 R |
| 4,680,852 A | 7/1987 | Centore | 29/461 |
| 4,769,906 A | 9/1988 | Purpura et al. | 29/857 |
| 4,857,012 A | 8/1989 | Yard | 435/471 |
| 4,989,805 A * | 2/1991 | Burke | 242/107.1 |
| 5,005,611 A | 4/1991 | Hecker | 140/147 |
| 5,094,396 A * | 3/1992 | Burke | 242/107 |
| 5,735,315 A | 4/1998 | Petsche | 139/68 |
| 6,019,304 A * | 2/2000 | Skowronski t al. | 242/373 |

* cited by examiner

Primary Examiner—Dean A. Reichard
Assistant Examiner—W. David Walkenhorst
(74) Attorney, Agent, or Firm—Greer, Burns & Crain, Ltd

(57) ABSTRACT

A seamless flat-round conductive cable is adapted for use in a retractable cord reel having a spool on which a round portion of the cable is wound and a cable expansion chamber in which a flat portion of the cable is disposed. The cable has a plurality of seamless conductive members, each of which may include an inner conductor and an outer insulating layer. The cable includes a first cable portion with a substantially flat configuration and a second cable portion with a substantially round configuration. The first cable portion includes a plurality of conductive members which are held together in a substantially flat configuration by, alternatively, bonding, jacketing or weaving the conductive members together. The second cable portion includes a plurality of conductive members, each of which is seamlessly connected to i.e., integral with, the respective conductive members of the first cable portion. The conductive members of the second portion are preferably twisted to form a substantially round configuration.

31 Claims, 4 Drawing Sheets

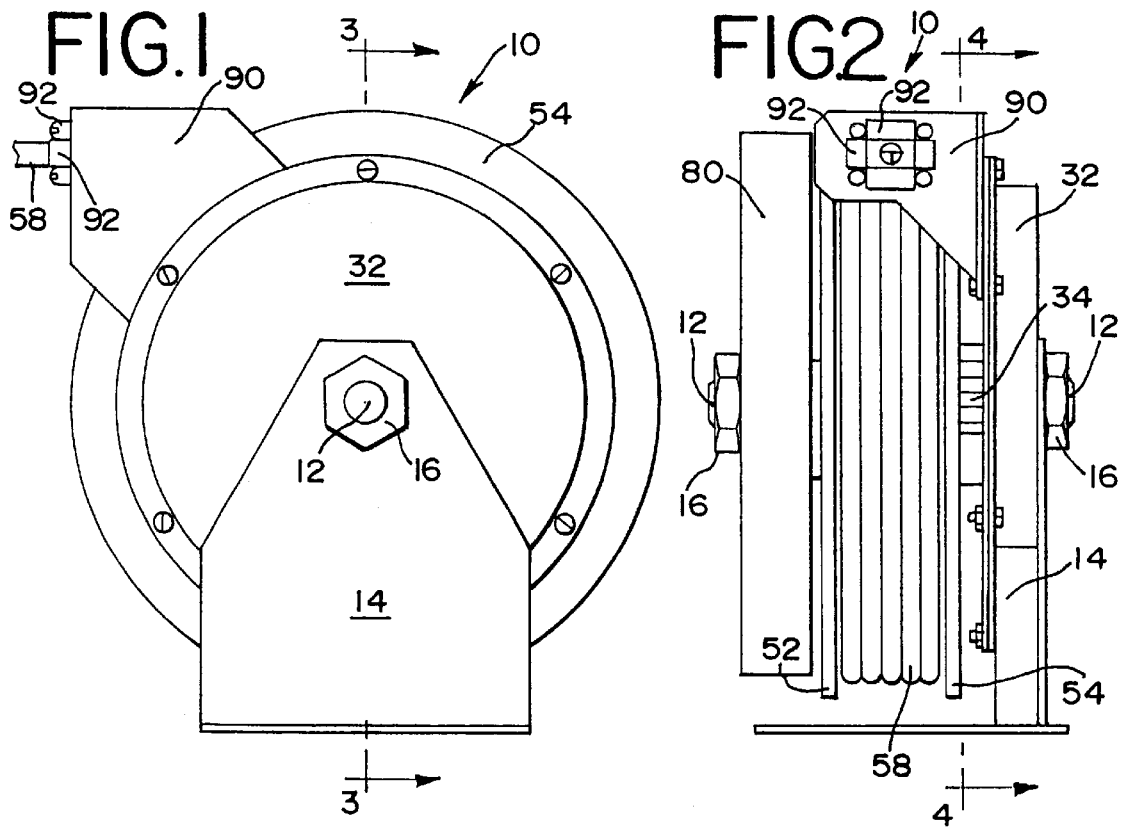
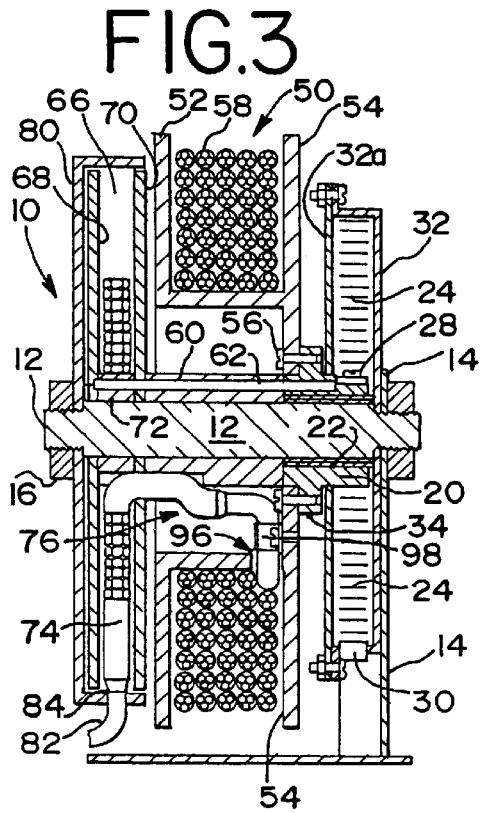
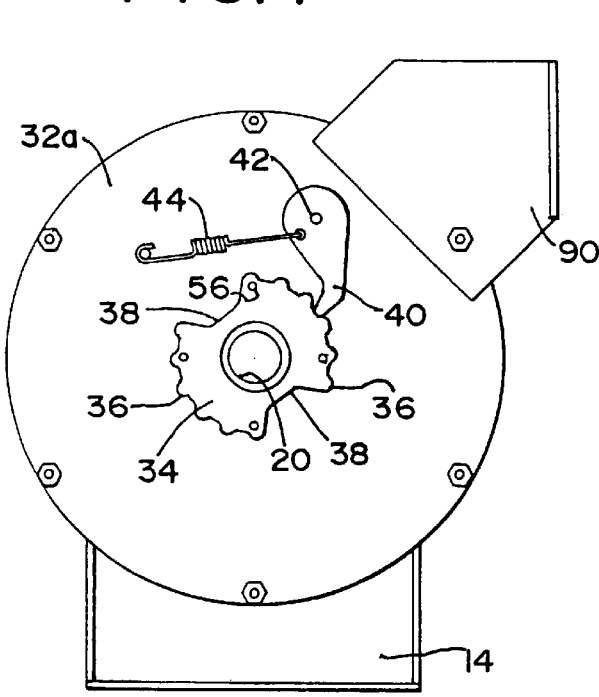

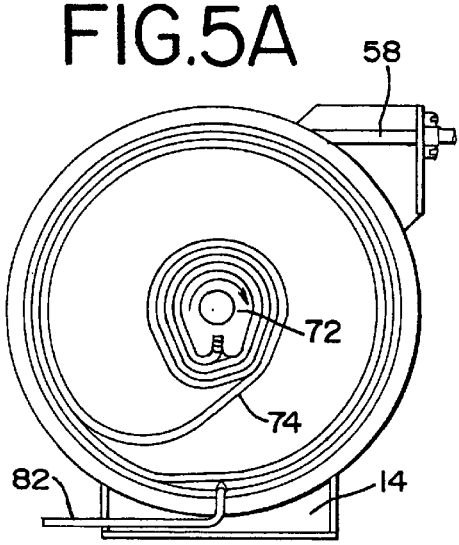
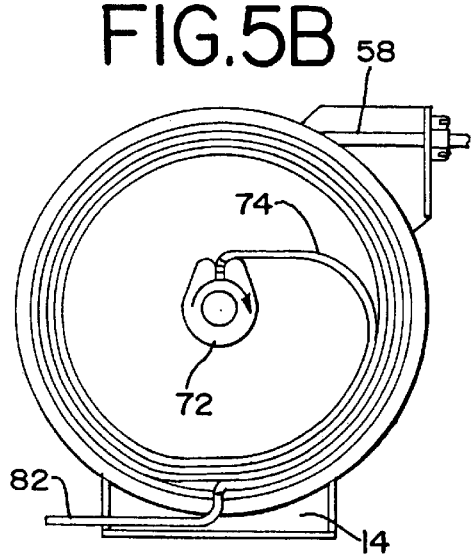
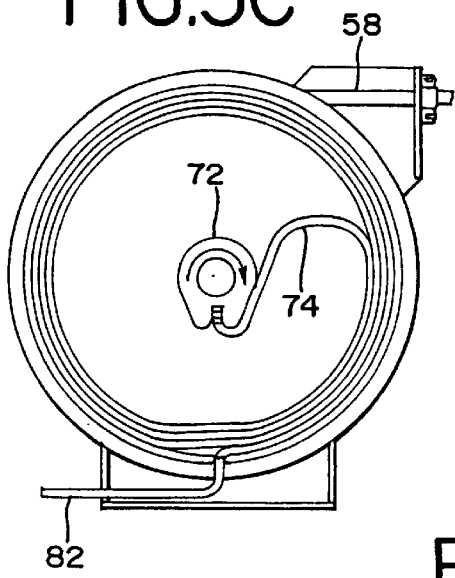
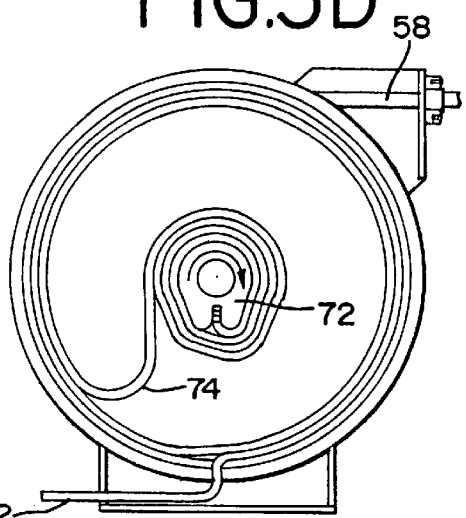
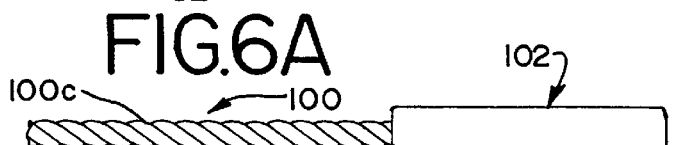
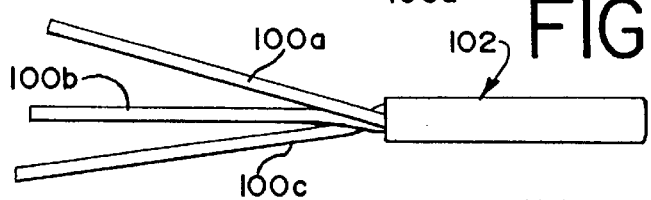
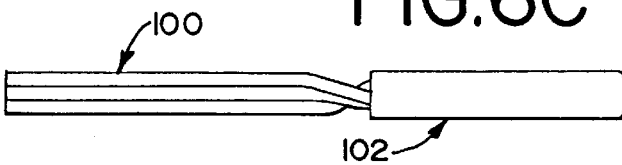

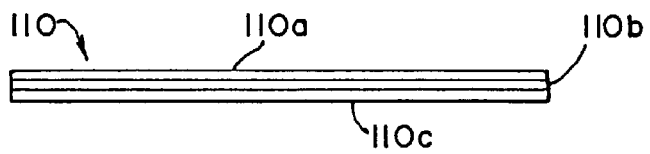
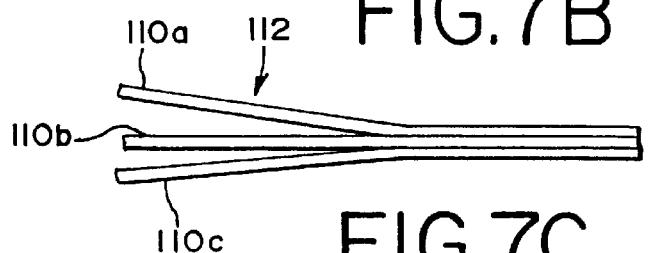
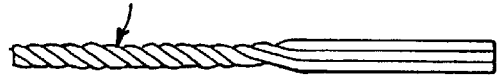
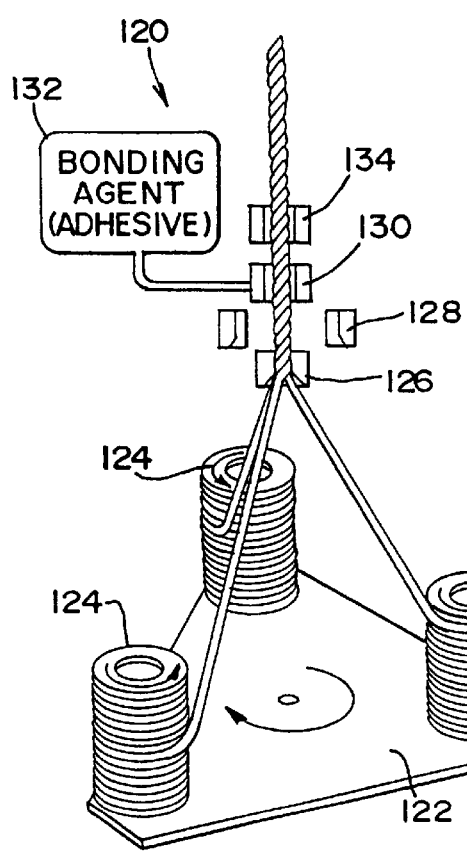
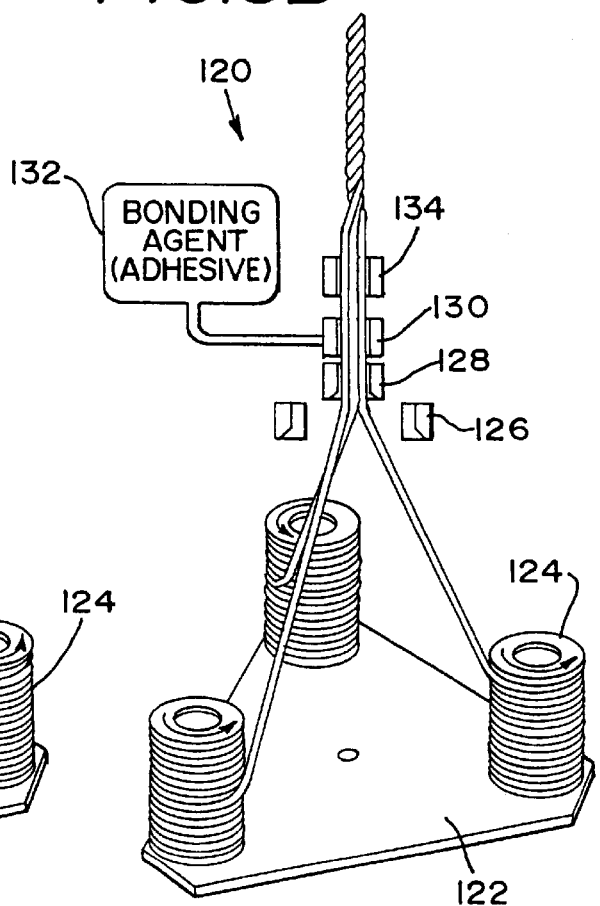

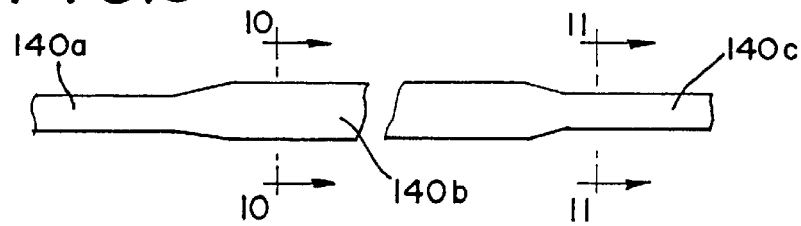
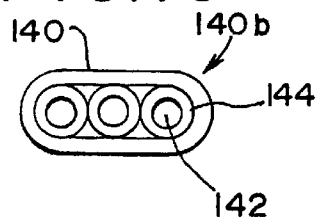 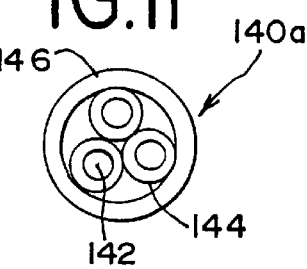 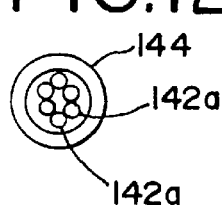
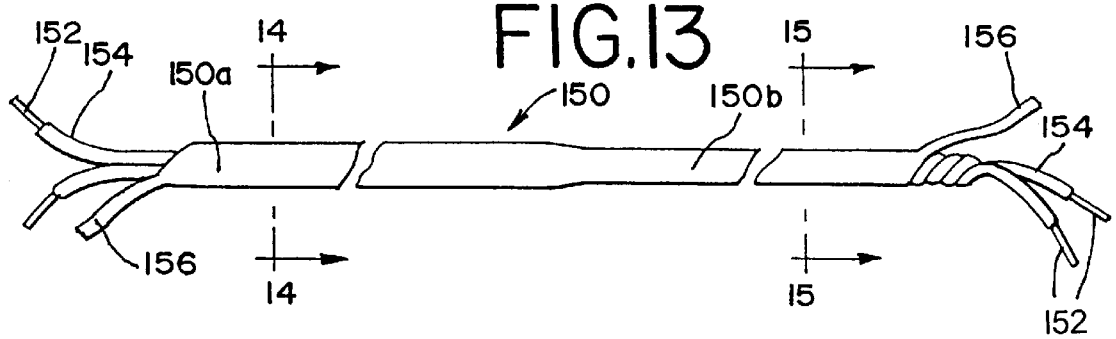
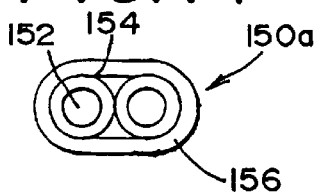 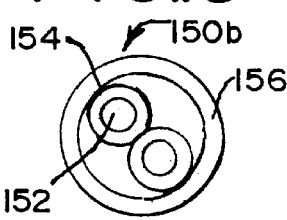 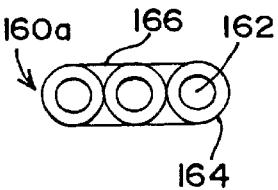
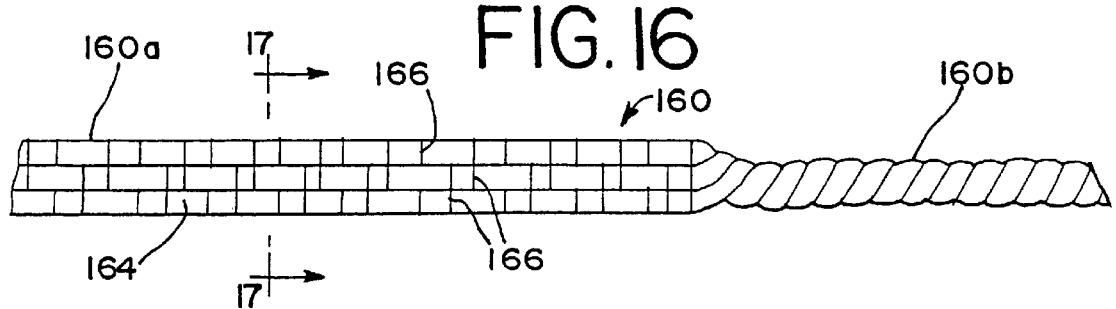

SEAMLESS FLAT-ROUND CONDUCTIVE CABLE FOR A RETRACTABLE CORD REEL

CROSS REFERENCE

This application is a continuation-in-part of application Ser. No. 09/003,309 filed Jan. 6, 1998, now U.S. Pat. No. 6,019,304, which in turn is a continuation-in-part of Ser. No. 08/779,794 filed Jan. 7, 1997, now abandoned; and this application is a continuation-in-part of application Ser. No. 09/197,326 filed Nov. 20, 1998, now abandoned.

FIELD OF THE INVENTION

The present invention is directed to retractable cord reels, and in particular to a seamless, spliceless conductive cable having a flat portion and a round portion for use in a retractable reel.

BACKGROUND OF THE INVENTION

Retractable cord reels have been used in various applications to retractably store various types of cables. The cable held on the reel typically has a stationary end portion and a portion that may be extended from and retracted back into the reel. Conventionally, the reel comprises a spring-loaded spool on which the extendable portion of cable is wound. The extendable portion of the cable may be withdrawn from the reel, causing the spool to rotate against the force of the spring. Upon release of the cable, the spring causes the spool to rotate in the opposite direction thereby retracting the cable back onto the spool. A problem common to all prior art cord reels is providing a continuous electrical connection between the rotating extendable portion of the cable and the stationary end portion. Two basic types of cord reels have been developed to address this problem.

One type of reel utilizes rotating contacts, commonly placed between the rotating reel and a stationary housing. The stationary end portion of the cable is separate from the extendable portion. The stationary cable is connected to the contacts carried by the housing, and the extendable portion is connected to the contacts carried by the reel. When the reel rotates, substantially continuous contact is made between the rotating contacts. However there are numerous, well documented disadvantages of cord reels having moving contacts. Moving contacts have a propensity to spark, making such reels unsuitable for use in wet environments, hazardous environments and in medical applications, among others.

To overcome these problems, a second type of retractable cord reel has been developed that eliminates contacts. The reel comprises a spool on which the extendable portion of cord is held, an expansion chamber in which a fixed length of cable is spirally wound. The two cable portions are connected, typically in or adjacent the hub of the spool. As the spool rotates the spirally wound, fixed cable expands and contracts within the expansion chamber. An example of reels of this type is disclosed in U.S. Pat. No. 5,094,396 to Burke, the disclosures of which are hereby incorporated by reference.

It has been well known in the art that reels of the second type function properly and enjoy an acceptable service life when the fixed cable portion in the expansion chamber is flat, and the extendable cable portion is round. If the extendable cable portion is flat, it will not retract properly on the spool. If the fixed cable portion is round, it tends to twist and snarl in the expansion chamber. Accordingly, a combination flat and round cable is required. Conventionally, flat-round cables, i.e., a cable having a flat portion and a round portion, have been fabricated by splicing a flat cable to a round cable. This is acceptable in many, but not all applications. In hazardous and wet environments, spliced cables are unacceptable. Further, some electronic applications, splices in cable conductors can cause distortions to electronic signals carried by the cable.

U.S. Pat. No. 4,384,688 to Smith discloses a reel assembly having a reel about which a telephone cable is retractably wound. A helically coiled spring urges the reel to retract the telephone cable into the reel assembly. The telephone cable is seamless and has a constant cross-sectional shape at all points along the cable. Although it avoids the use of a spliced cable, the Smith reel is not optimal since it does not utilize a flat-round cable as described above.

Although numerous designs for retractable cord reels have been proposed, there has been no adequate solution for a retractable cord reel having seamless cable that can be used in hazardous and wet environments that is durable and has a long service life. There is and has been significant demand for such a reel for many years.

SUMMARY OF THE INVENTION

The invention is directed to a seamless flat-round conductive cable for use in a retractable cord reel of the type having a rotating spool and a cable expansion chamber. The flat-round conductive cable comprises a first cable portion adapted to be held or disposed in the expansion chamber of the reel. The first cable portion comprises a plurality of elongated, seamless conductive members, each conductive member having a conductor substantially covered by an insulating layer. A second cable portion is adapted to be retractably held on the spool of the reel. The second cable portion likewise comprises a plurality of elongated, seamless conductive members, each having a conductor substantially covered by an insulating layer. The conductive members of the second cable portion are seamlessly continuous, i.e., unitary, with respective ones of the conductive members of said first cable portion. One or more of any of several means are employed to maintain the first cable portion in a substantially flat configuration and said second cable portion in a substantially round configuration.

The first or flat portion of the cable preferably comprises plural conductive members arranged in a substantially parallel, side-by-side configuration. The first portion of the cable is held in this configuration in any one of several different ways. One means for maintaining the first cable portion in said substantially flat configuration is bonding the conductors together, side-by-side. Chemical bonding with ultraviolet curing has been found to work well. If the insulating layer on the conductors is a thermoplastic or resin, such as polyvinyl chloride, heat or thermo-bonding may used.

A preferred means for maintaining the first cable portion in a substantially flat configuration is a jacket. The jacket may be woven nylon, which will function to protect the conductive members from abrasion, reduce friction in the expansion chamber and provide smoother operation, as well as holding the conductors in a flat configuration. Alternatively, the jacket may be comprised of a conductive material such as copper. A conductive jacket will provide the additional benefits of functioning as an EMF shield or may be used as an additional conductor, such as a ground. If the jacket acts as a ground conductor, one less conductive member is required, thus beneficially reducing the size and cost of the cable. A conductive jacket may be woven or spirally formed.

Another preferred means for maintaining said first cable portion in a substantially flat configuration comprises strands woven between the conductive members of the first cable portion. The strand is woven between conductive members to bind them together in a parallel, side-by-side configuration, thereby forming a substantially flat cable. Weaving is relative inexpensive, does not appreciably add thickness or weight to the cable, and allows the conductive members a small amount of relative movement between them, which provides significant benefits in a smaller, more durable retractable cord reel.

The second, round portion of the cable may likewise be formed several different ways. A substantially round configuration is achieved by twisting the plural conductors together. The twisted configuration may be maintained without additional holding means. Nevertheless, one may bond the conductive members together as described above. Preferably, a jacket is added over the conductive members. The jacket may desirably comprise an elastomeric material to protect the conductive members from abrasion and moisture. Alternatively, the jacket may comprise a fabric braid, such as nylon. As described above, a conductive jacket may be employed as an EMF shield or as an additional conductor. It is particularly desirable to use a conductive jacket as a conductor, such as a ground conductor, and thereby eliminate one of the standard conductive members. This will substantially reduce the diameter of the round or second portion of the cable. A greater length of retractable cable may thereby be provided on spool of a given size. If a conductive jacket is used, it may be desirable to apply an insulating cover over the conductive jacket of the second portion of the cable.

If a jacket is used to maintain the two cable portions in the respective flat and round configurations, the jacket may desirably be continuously woven over both portions of the cable.

Several means for holding the cable in a flat/round configuration have been disclosed. It is to be understood that the invention as broadly claimed is not limited to these specific means but should be construed to cover all means that will provide the desired result of maintaining a flat/round cable configuration.

The conductive members comprise a conductor and layer of insulating material substantially covering the conductor. The conductor preferably comprises a multiplicity of wire strands. Stranded wire is has better resistance to fatigue than solid wire. The first or flat cable portion is subjected to considerable fatigue in the cable expansion chamber, as described below. Likewise, the round or retractable cable is subjected to a variety of forces including fatigue. A greater number of strands will beneficially provide a more durable and longer life to the retractable cord reel.

The cable may also have a third cable portion with a substantially round configuration, with the flat cable portion being disposed between the two round cable portions. The third cable portion has a plurality of seamless conductive members, each being seamlessly connected to the respective conductive members of the first cable portion.

Accordingly, the invention presents a facile solution to the long-standing problems encountered in the retractable cord reel art. The potential risk of a spark in a cord reel having the cable of the invention is greatly reduced, because the cable is continuous and seamless, and splices and contacts have been eliminated. Accordingly, a cord reel having the flat-round cable of the invention may be advantageously used in environments that heretofore have been unsuitable for retractable cord reels. Potential new uses include hazardous environments (e.g., chemical, petroleum, dust laden), wet environments (e.g., outdoors, marine), medical environments such a hospitals, and industrial environments. Specific retractable cord reel applications that were not heretofore possible include all-weather power cord reels for wet/dry vacuums, electric vehicle charging, engine heater connections, and electric hook-ups for boats.

Another application of the invention is to sensitive electronic applications such as microphone cables. Since the cable of the invention is seamless, electronic distortions caused by splices are eliminated.

Additional commercial applications, features and advantages of the present invention will be apparent to those of ordinary skill in the art in view of the detailed description of the preferred embodiments, which is made with reference to the drawings, a brief description of which is provided below.

BRIEF DESCRIPTION OF THE DRAWINGS

FIG. 1 is a front elevational view of a retractable reel;

FIG. 2 is a side elevational view of the reel of FIG. 1 with a portion of the housing removed;

FIG. 3 is a cross-sectional view of the reel taken along lines 3—3 of FIG. 1;

FIG. 4 is a cross-sectional view of the reel taken along lines 4—4 of FIG. 2;

FIGS. 5A–5D illustrate the winding and unwinding of the flat cable portion within a cable expansion compartment of the reel;

FIGS. 6A–6C illustrate a method of converting a round cable into a seamless flat-round cable;

FIGS. 7A–7C illustrate a method of converting a flat ribbon cable into a seamless flat-round cable;

FIGS. 8A and 8B illustrate a method of forming a continuous flat-round cable;

FIG. 9 is a plan view of a cable having a substantially flat central portion and a substantially round portions extending from both ends of the central portion;

FIG. 10 is a cross-sectional view of a substantially flat cable portion taken along lines 10—10 of FIG. 9;

FIG. 11 is a cross-sectional view of a substantially round cable portion taken along lines 10—11 of FIG. 9;

FIG. 12 is a cross-sectional view of a conductive member of the round cable of FIG. 11.

FIG. 13 is a plan view of a flat-round cable of the invention having a jacket.

FIG. 14 is a cross-sectional view of the flat portion of the cable taken along line 14—14 of FIG. 13.

FIG. 15 is a cross-sectional view of the round portion of the cable taken along line 15—15 of FIG. 13.

FIG. 16 is a plan view of flat-round cable having a woven flat portion.

FIG. 17 is a cross-section taken along line 17—17 of FIG. 16.

DETAILED DESCRIPTION OF THE PREFERRED EMBODIMENTS

A retractable reel 10 having a seamless flat-round cable disposed therein is shown in FIGS. 1–4. Referring to FIGS. 1–3, the reel 10 has a central axle 12 in the form of a rod having threaded ends which is connected to a metal stand 14 via a pair of nuts 16 threaded to each end of the axle 12. The axle 12 passes through a central bore in a hub 20, which has a cylindrical bearing sleeve 22, which may be composed of bronze, for example. One end of a helically coiled metal spring 24 is connected to the hub 20 by a screw 28, and the other end 30 of the spring 24, which is bent at an angle, passes through a slot in the side of a spring housing 32 to secure that end 30 to the spring housing 32. The particular manner of connecting the spring ends is not important to the invention and other methods of connection could be used.

As shown in FIG. 4, the hub 20, which may be composed of plastic for example, has a ratchet 34 integrally formed therewith. The ratchet 34 has a plurality of teeth 36 and a pair of oppositely disposed recesses 38 formed therein. A pawl 40 is connected to an interior plate 32a of the spring housing 32 via a pivot pin 42, and the pawl 40 is pivotally biased towards the ratchet 34, via a spring 44. Referring to FIG. 3, a spool 50 having a pair of side walls 52, 54 is connected to the hub 20 via a plurality of screws 56 which pass through the side wall 54 into the ratchet 34. A length of round cable 58 is retractably wound about the spool 50 between the side walls 52, 54. The axle 12 passes through a bore in central hub 60, which is connected to the hub 20 by a plurality of screws 62 which are threaded into the hub 20.

A cable expansion chamber 66 defined by a pair of flat, circular side walls 68, 70 is disposed adjacent the spool 50. A hub 72 is disposed between the side walls 68, 70. The side walls 68, 70 and the hub 72 are fixed together by the screws 62. A length of coiled flat cable 74 is disposed within the cable expansion chamber 66 around the hub 72. The flat cable portion 74 is seamlessly connected to, i.e., entirely integral with, the round cable portion 58 at a junction point 76 shown in FIG. 3, as described in detail below. A cover 80 is disposed over the cable expansion chamber 66. A second round cable portion 82 is seamlessly connected to the flat cable portion 74 at a junction point 84.

A cable support bracket 90 is attached to the interior plate 32a of the spring housing 32. The cable support bracket 90 has an aperture through which the end of the round cable portion 58 passes, as shown in FIG. 1, and four plastic rollers 92, which facilitate the passing of the cable 58 through the aperture in the support bracket 90. As shown in FIG. 3, the cable portion 58 passes through an aperture 96 in the bottom (horizontal) wall of the spool 50 and is fastened to the side wall 54 of the spool via a cable bracket 98 that is threaded into the side wall 54. The flat cable portion 74 passes through an aperture in the side wall 70 of the cable expansion chamber 66.

Both ends of the round cable portions 58, 82 have conventional connectors (not shown) attached thereto. Where the reel 10 is used for electrical power applications, such as 110 volts, one of the connectors may comprise a conventional connector having two flat prongs and a cylindrical prong and the other connector may comprise a connector having two rectangular recesses (to receive two flat prongs) and a cylindrical recess (to receive a cylindrical prong). The round cable portion 58 shown in FIG. 1 may have a stop mechanism (not shown), such as a molded or plastic ball having a diameter larger than the aperture into which the large cable portion 58 retracts, spaced from the end of the connector, to prevent the round cable portion 58 from completely retracting into the spool 50.

In operation, a user of the reel 10 pulls on the round cable portion 58 which protrudes from the cable support bracket 90 to extend a length of the round cable 58 off of the spool 50 and out of the reel 10. During the extending process, the spool 50, the hubs 20, 60, 72, the hub bearing 22, the spool 50, and the side walls 68, 70 of the cable expansion chamber 66 all rotate together about the central axle 12, while the axle 12, the spring housing 32, and the expansion chamber cover 80 remain stationary.

During the pulling/extending process, the spring 24 helically coiled within the spring housing 32 becomes more tightly coiled since the end of the spring 24 attached to the hub 20 is rotating with respect to the end 30 of the spring 24 attached to the stationary spring housing 32, and the spring 24 urges the ratchet 34 (FIG. 4) in a counterclockwise direction. The combination of the ratchet teeth 36 and the end of the pawl 40 prevent the cable 58 from being retracked back into the reel 10 during the pulling process, unless the end of the pawl 40 is positioned in one of the two recesses 38 and the cable 58 is released.

Referring to FIGS. 5A–5D (in which the cable expansion chamber cover 80 and side wall 68 have been omitted for clarity), as the round cable portion 58 is being pulled out of the reel 10, the flat cable portion 74 undergoes a conventional winding/unwinding process in which the flat cable 74 is first unwound from the hub 72 to an expanded position around the outside portion of the expansion chamber 66 (FIGS. 5A and 5B), then rewound around the hub 72 as it continues to rotate.

To cause the round cable 58 to retract back into the reel 10, the user pulls the round cable 58 until the end of the pawl 40 is positioned in one of the two recesses 38, in which case the spring 44 will pull the pawl 40 to the left in FIG. 4, allowing the helically coiled spring 24 (FIG. 3) to move the ratchet 34 (and the attached spool 50) counterclockwise to cause the round cable 58 to retract into the spool 50.

The foregoing description in reference to the cord reel shown in FIGS. 1–5 is illustrative of the application of the cable of the invention. It is to be understood that the cable of the invention may be used in other cord reels of the type having a spool and an expansion chamber. For example, the cable of the invention finds particular application to the cord reels shown and described in U.S. Pat. Nos. 4,989,805 to Burke and 5,094,396 Burke, the disclosures of which are hereby incorporated by reference.

The seamless flat-round cable incorporated in the reel 10 may be formed by a number of different methods. As used herein, a seamless "flat-round" cable has a first portion with a substantially flat configuration or cross-sectional area and a second portion with a substantially round configuration or cross-sectional area. A "flat" configuration refers to a cable having substantially parallel side-by-side conductors, as shown in FIGS. 10, 14 and 17, for example, or a ribbon-type cable, or other configuration which has substantially flat top and bottom sides. A "round" configuration refers to a cable having twisted conductors, as shown in FIGS. 11 and 15, for example, a bundled conductor configuration, a co-axial cable, or other configuration that has a substantially equal dimensioned cross-section.

One method of forming a flat-round cable having a plurality of seamless conductive members is converting a conventional round cable having a plurality of twisted conductive members into flat-round cable is illustrated in FIGS. 6A–6C. Referring to FIG. 6A, the first step in this method is to remove the outer insulating jacket of a conventional cable to form a cable having a first elongate portion 100 with a plurality of conductive members 100a–c, each being composed of a central conductor and an outer insulating layer.

Referring to FIG. 6B, the twisted conductive members 100a–c of the elongate portion 100 are then uncoiled, either by hand or by machine. As used herein, the term "twisted"

may refer to coiling or braiding or other methods of twisting. Referring to FIG. 6B, the untwisted conductive members 100*a–c* of the elongate portion 100 are aligned in a substantially flat configuration, such as being aligned in parallel rows, and maintained in that flat configuration. To perform such steps, a suitable adhesive may be applied to the individual untwisted conductive members 100*a–c* to maintain their substantially flat configuration. Alternatively, the adhesive may be applied after the conductive members 100*a–c* are aligned in a substantially flat configuration.

A second method of forming a seamless flat-round cable is by converting a conventional ribbon cable having a plurality of interconnected conductive members into a flat-round cable is shown in FIGS. 7A–7C. Referring to FIG. 7A, a length of ribbon cable 110 having three interconnected conducted members 110*a–c* is shown. The conductive members 110*a–c* of one elongate portion 112 of the ribbon cable 110 are then separated, as shown in FIG. 7B, either by hand or by machine, and then as shown in FIG. 7C, the elongate portion 112 of the conductive members 110*a–c* is then twisted together in a twisting machine. Optionally, an insulating covering or jacket may then be applied over the twisted conductive members 110*a–c*.

The conductive members 110*a–c* of the right-hand end of the conventional ribbon cable may also be separated and then coiled (while leaving a middle portion of the ribbon cable intact) to form a cable having a central portion having a substantially flat configuration and two end portions, each of which has a substantially round configuration.

A third method of forming a seamless flat-round cable is shown in FIGS. 8A and 8B. This method is performed by a cable-forming machine 120 having a rotating carriage 122 on which three spools 124 of insulated wire are rotatably mounted. The machine 120 has a selectively engagable/disengagable flat cable guide 128, a selectively activatable adhesive applicator 130 connected to an adhesive reservoir 132, and an adhesive-curing station 134, such as an oven or a source of radiation, such as ultraviolet light.

To form round portions of a seamless flat-round cable, the round cable guide 126 is activated (by moving a number of movable jaws inward so that they contact the cable) and the rotating carriage 122 is rotated while three conductive cables are pulled upwards through the round cable guide 126, as shown in FIG. 8A, thus twisting together the cables to form a twisted cable, which can then be provided with an insulated covering in a conventional manner. During the formation of the substantially round portions of the cable, the adhesive applicator 130 and the adhesive curing station 134 need not be activated.

To form a flat portion of cable, with the flat cable guide 128 activated and the round cable guide 126 deactivated, as shown in FIG. 8B, three conductive cables are pulled through the flat cable guide 128 while carriage 122 is stationary. The adhesive applicator 130 is activated to dispense adhesive to the cables so that they retain their flat configuration, and the adhesive-curing station 134 is activated to cure the adhesive.

Alternating lengths of flat and round cable portions may be formed by alternating the processes described in connection with FIGS. 8A and 8B. The time for which each of the two processes is performed could be automatically controlled to produce seamless flat-round cable having alternating flat and round portions of specific lengths. The flat-round cable could then be cut by a cutting machine at predetermined intervals to produce cables designed for specific reels. It should be noted that the number of conductive cables that are twisted together can be varied by varying the number of cable spools mounted on the rotating carriage 122. Advantageously, a continuous jacket may be applied over both the flat and round portions of the cable. The jacket may be braided textile or a continuously extruded elastomer jacket.

A seamless flat-round cable having two portions 140*a*, 140*c* with substantially round configurations and a central portion 140*b* with a substantially flat configuration is illustrated in FIGS. 9–12. As shown in FIG. 10, the substantially flat portion 140*b* may have an outer cover 140, such as a braided nylon cover, and three inner conductive members each of which is composed of a central wire 142 and an insulating jacket 144 surrounding the wire 142. As shown in FIG. 11, the substantially round portion of the cable may have a different outer cover 146, such as rubber, than the flat portion of the cable. As shown in FIG. 12, the central wire 142 preferably comprises a multiplicity of individual wire strands 142*a*. The strands are preferably 38 gauge or thinner to provide good flex life.

Although the use of an adhesive for bonding the conductive members together is described above, other methods of bonding may be used, such as partial melting of the insulating jackets via the application of heat, the use of solvents, the use of an outer restraining jacket, or some combination thereof.

Another preferred embodiment of the flat-round cable 150 of the invention is illustrated in FIGS. 13–15. The cable comprises a first, flat portion 150*a* and a second, round portion 150*b*. The cable comprises continuous, seamless, spliceless conductive members that have inner conductor 152 and outer insulating layer 154. The conductive members are held in their respective flat 150*a* and round 150*b* configurations by continuous jacket 156. Jacket 156 may be conducting or non-conducting depending on the desired application. Jacket 156 may desirably comprise nylon braid. Alternatively, it may comprise a braided or wound conductive jacket, such as copper. A conductive jacket may serve as an EMI-RFI shield, or could be used a ground conductor. When used as a ground conductor, the jacket takes the place of one conductive member and thereby reduces the diameter of the round portion of the cable 150*b*, thereby permitting a greater length of cable to be held on a spool of given size.

Another preferred embodiment of the flat-round cable 160 of the invention is illustrated in FIGS. 16 and 17. The cable comprises a first, flat portion 160*a* and a second, round portion 160*b*. The conductive members comprise an inner conductor 162 covered with insulating layer 164. The flat portion of the cable is woven together with strands 166. The process of forming a flat cable by weaving strands between the conductive members is known in the art, as disclosed for example in U.S. Pat. No. 5,735,315 to Nasser et al, and assigned to A.E. Petsche Co. Inc. The second portion of the cable 160*b* is twisted to a substantially round configuration.

The reel 10 and the seamless flat-round cable disposed therein may be used in various applications, such as for electrical power applications, for telecommunications, and other applications. When used for electrical power applications, the reel 10 is considered explosion-proof since no sparks or high voltages that otherwise might escape from a spliced power cable can escape from the seamless cable. For applications requiring electromagnetic shielding, the seamless flat-round cable could be provided with a seamless electromagnetic shield disposed underneath the outer insulating cover.

Although various methods of forming the seamless flat-round cable have been described above, other methods could be used. For example, the cross-sectional shape of the external insulating coating could be varied to produce a seamless flat-round cable. In particular, portions of a ribbon cable could be provided with an insulating coating having a round cross-section while leaving the remaining portions uninsulated. Alternatively, a plurality of coiled conductors could be provided with an insulating cover having alternatively flat and round cross-sections.

Additional modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A flat-round electrical cable for a retractable cord reel, the reel having a spool and an expansion chamber; the cable comprising:
    a first cable portion adapted to be held in the expansion chamber of the reel, said first cable portion comprising a plurality of elongated, seamless conductive members, each conductive member having a conductor substantially covered by an insulating layer, and means for maintaining said first cable portion in a substantially flat configuration;
    a second cable portion adapted to be retractably held on the spool of the reel, said second cable portion comprising a plurality of elongated, seamless conductive members, each conductive member having a conductor substantially covered by an insulating layer, each of said conductive members of said second cable portion being seamlessly continuous with respective ones of said conductive members of said first cable portion, said second cable portion having a substantially round configuration.

2. A cable as in claim 1 wherein said plural conductive members of said first cable portion are arranged in a substantially parallel, side-by-side configuration.

3. A cable as in claim 1 wherein said plural conductive members of said second cable portion are twisted in a substantially round configuration.

4. A cable in claim 1, further comprising a jacket covering said second cable portion.

5. A cable as in claim 4, wherein said jacket comprises nylon braid.

6. A cable as in claim 4, wherein said jacket comprises an insulating elastomer.

7. A cable as in claim 1 wherein each of said conductors comprises a multiplicity of wire strands.

8. A cable as in claim 1 wherein said means for maintaining said first cable portion in said substantially flat configuration comprises a chemical bond.

9. A cable as in claim 1, wherein said means for maintaining said first cable portion in a substantially flat configuration comprises thermal-bonding of said insulating layers of adjacent said conductive members.

10. A cable as in claim 1, wherein said means for maintaining said first cable portion in a substantially flat configuration comprises a jacket.

11. A cable as in claim 10, wherein said jacket is conductive material.

12. A cable as in claim 1, wherein said means for maintaining said first cable portion in a substantially flat configuration comprises strands woven between said conductive members of said first cable portion.

13. A cable as in claim 1, further comprising means for maintaining said second cable portion in a substantially round configuration.

14. A cable as in claim 1, further comprising a jacket surrounding said second cable portion.

15. A cable as in claim 14, wherein said jacket comprises braided conductive material.

16. A cable as in claim 1, wherein said means for maintaining said first cable portion in a substantially flat configuration comprises a continuous braided jacket of conductive material, and wherein said braided jacket extends over both said first and second portions of said cable.

17. A retractable cord reel with a seamless electrical cable comprising:
    a support;
    a spool rotatably mounted in said support;
    an expansion chamber adjacent said spool;
    a first cable portion disposed in said expansion chamber, said first cable portion having a flat configuration and comprising a plurality of elongated, seamless conductive members, each conductive member having a conductor substantially covered by an insulating layer;
    a second cable portion retractably held on said spool, said second cable portion having a substantially round configuration and comprising a plurality of elongated, seamless conductive members, each conductive member having a conductor substantially covered by an insulating layer, each of said conductive members of said second cable portion being seamlessly continuous with respective ones of said conductive members of said first cable portion.

18. A cable as in claim 17 further comprising a third cable portion having a substantially round configuration, said first cable portion being disposed between said second and third cable portions, said third cable portion comprising plural elongated, seamless conductive members, each conductive member having a conductor substantially covered by an insulating layer, each of said conductive members of said third cable portion being seamlessly continuous with respective ones of said conductive members of said first cable portion.

19. A cable as in claim 17, further comprising comprises a continuous braided jacket of conductive material covering said first and second cable portions.

20. A cable as in claim 19 wherein said inner conductor comprises a multiplicity of electrically conductive wire strands.

21. A method of forming a flat-round cable comprising the steps of:
    (a) pulling plural conductive members for a predetermined first length, said conductive members being parallel and side-by-side relative to one another;
    (b) bonding said first length of conductive members together to form a substantially flat first portion;
    (c) continuing to pull said plural conductive members for a second length; and
    (d) twisting said second length of conductive members to form a substantially round second portion.

22. A method as in claim 21 further comprising the step of applying an insulating jacket to said second portion.

23. A method as in claim 21 further comprising the step of applying a continuous, seamless layer over both said first and second cable portions.

24. A method as in claim 23 wherein said continuous, seamless layer comprises a braided layer.

25. A method as in claim 21 wherein the step of bonding comprises chemical bonding.

26. A method as in claim 21 wherein step (d) comprises the steps of:
- (d1) providing a plurality of reels on a rotating carriage, each of said reels having a length of conductive members disposed thereon;
- (d2) causing said rotating carriage to rotate while said seamless conductive members are being pulled during said step (c).

27. A method as in claim 21 further comprising the steps installing said first cable portion in an expansion chamber of a retractable cord reel, and winding said second cable portion on a spool of the retractable cord reel.

28. A method of making a flat-round cable for a cord reel, comprising the steps of:
- (a) pulling plural conductive members for a predetermined first length, said conductive members being parallel and side-by-side relative to one another to form a substantially flat first portion;
- (b) continuing to pull said plural conductive members for a second length;
- (c) twisting said second length of conductive members to form a substantially round second portion; and
- (d) applying a continuous jacket over said first and second portions to hold said first portion in a substantially flat configuration and to hold said second portion in a substantially round configuration.

29. A method as in claim 28 wherein said continuous jacket is braided.

30. A method as in claim 28 further comprising the steps installing said first cable portion in an expansion chamber of a retractable cord reel, and winding said second cable portion on a spool of the retractable cord reel.

31. A method of making a flat-round cable, comprising the steps of:
- providing a first length of plural conductive members;
- weaving said first length of conductive members to each other in a parallel, side-by-side relationship to form a flat first portion;
- providing a second length of plural conductive members, said second length being continuous and seamless with said first length;
- twisting said second length of conductive members to form a substantially round second portion.

* * * * *

UNITED STATES PATENT AND TRADEMARK OFFICE
CERTIFICATE OF CORRECTION

PATENT NO. : 6,372,988 B1  Page 1 of 1
DATED : April 16, 2002
INVENTOR(S) : Burke et al.

It is certified that error appears in the above-identified patent and that said Letters Patent is hereby corrected as shown below:

Column 1,
Line 10, please insert -- co-pending --

Column 4,
Line 45, please delete "10" and insert -- 11 --

Column 10,
Line 46, please delete "comprises"

Signed and Sealed this

Twenty-ninth Day of October, 2002

Attest:

Attesting Officer

JAMES E. ROGAN
Director of the United States Patent and Trademark Office